United States Patent [19]

Diaz

[11] Patent Number: 4,596,732
[45] Date of Patent: Jun. 24, 1986

[54] PLEATED HEAT-RECOVERABLE TAPE

[75] Inventor: Stephen H. Diaz, Los Altos, Calif.

[73] Assignee: Raychem Corporation, Menlo Park, Calif.

[21] Appl. No.: 569,627

[22] Filed: Jan. 10, 1984

Related U.S. Application Data

[60] Division of Ser. No. 272,445, Jun. 5, 1981, Pat. No. 4,428,790, which is a continuation-in-part of Ser. No. 158,765, Jun. 12, 1980, abandoned.

[51] Int. Cl.⁴ .............................................. B32B 31/04
[52] U.S. Cl. ............................. 428/181; 174/DIG. 8; 428/182; 428/222; 428/343; 428/347; 428/913
[58] Field of Search ............... 428/181, 182, 222, 347, 428/343, 913; 156/86, 184–187, 195; 264/230, 342 R; 138/DIG. 5; 174/DIG. 8; 273/81 R, 81 B, 81 D

[56] References Cited

U.S. PATENT DOCUMENTS

| | | | |
|---|---|---|---|
| 3,379,805 | 4/1968 | Roberts | 264/505 |
| 3,503,426 | 3/1970 | MacMillan et al. | 138/168 |
| 3,526,683 | 9/1970 | Heslop et al. | 264/22 |
| 3,885,015 | 5/1975 | Ono et al. | 264/230 |
| 3,892,564 | 9/1976 | Clabburn et al. | 138/110 |
| 4,001,065 | 1/1977 | Penneck et al. | 156/86 |
| 4,018,733 | 4/1977 | Lopez et al. | 156/327 |
| 4,085,286 | 4/1978 | Horsma et al. | 156/86 |
| 4,153,663 | 5/1979 | Vetter et al. | 264/286 |
| 4,177,446 | 12/1979 | Diaz | 264/105 |

FOREIGN PATENT DOCUMENTS

| | | |
|---|---|---|
| 2003380 | 7/1971 | Fed. Rep. of Germany . |
| 8018544 | 10/1980 | Fed. Rep. of Germany . |
| 55-77534 | 6/1980 | Japan . |
| 55-100128 | 7/1980 | Japan . |

Primary Examiner—Paul J. Thibodeau
Attorney, Agent, or Firm—T. Gene Dillahunty; Edith A. Rice; Herbert G. Burkard

[57] ABSTRACT

A transversely pleated, longitudinally heat-shrinkable tape is made from a heat-shrinkable polymeric film. One side of the tape may be adhesive-coated, and the other side may be coated with a thermochromic paint. The tape is wrapped around a substrate, and is particularly adapted, by reason of the pleats, to be wrapped around a substrate of non-uniform cross-section, e.g. a splice in a telephone cable. On heating the tape to its recovery temperature, the pleats disappear and the tape shrinks longitudinally to tightly cover the substrate. The tape may additionally comprise integral heating means.

12 Claims, 3 Drawing Figures

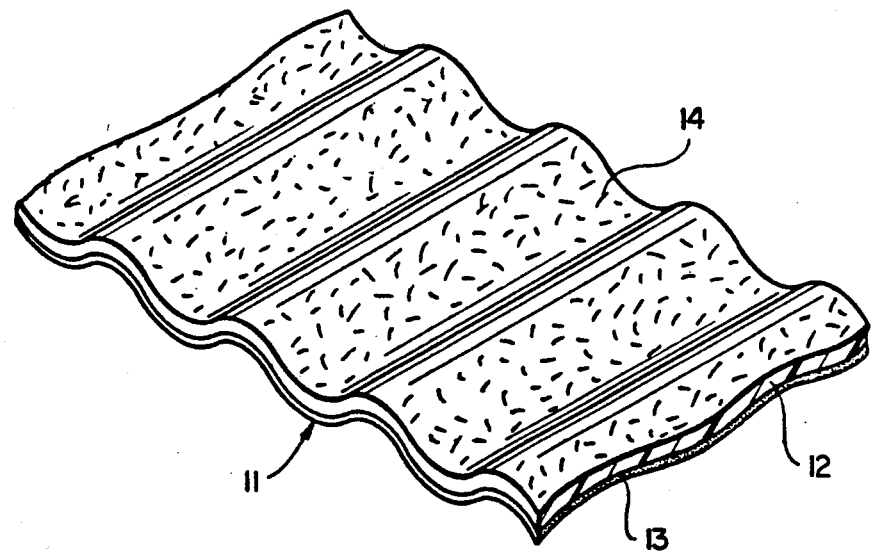
FIG_1
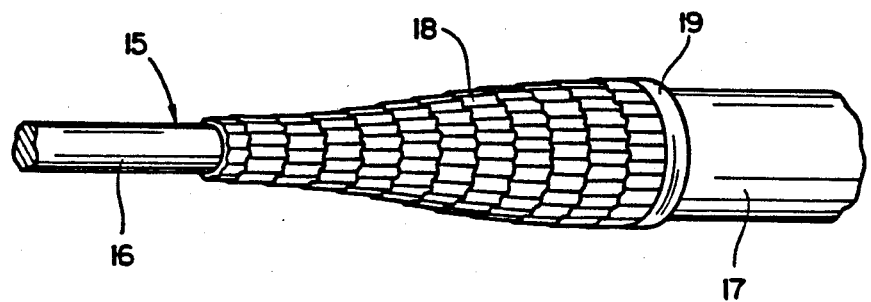
FIG_2
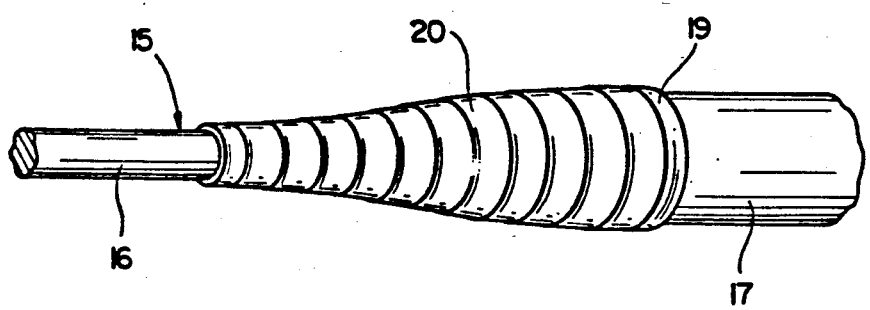
FIG_3

PLEATED HEAT-RECOVERABLE TAPE

This application is a divisional of my copending application, Ser. No. 272,445 filed June 5, 1981 and now U.S. Pat. No. 4,428,790, which is a continuation-in-part of my application, Ser. No. 158,765 filed June 12, 1980, now abandoned; the entire disclosures of which are incorporated herein by reference.

BACKGROUND OF THE INVENTION

1. Field of the Invention

This invention relates to pleated heat-recoverable wrapping tape.

2. Summary of the Prior Art

The technique of covering substrates, e.g. joints in electrical or telephone cables, with polymeric tape is well-known. Such polymeric tapes include both pressure-sensitive tapes, such as the common electrical tape, and heat-shrinkable tapes, such as those described in U.S. Pat. No. 4,001,065, the disclosure of which is incorporated herein by reference.

Pressure-sensitive tape requires a tight, careful wrapping in order to achieve an adequate seal, while heat-shrinkable tape is less craft-sensitive in that the shrinkage of the tape on heating to its recovery temperature tightens it onto the substrate. When the heat-shrinkable tape is either coated with adhesive, or is self-adhesive at its recovery temperature (as is the tape of U.S. Pat. No. 4,001,065), the seal is more easily formed.

Such heat-shrinkable tapes may include those which have integral heating means, especially those which are electrically self-heatable. Articles of this latter type are descrbed in U.S. Pat. Nos. 4,177,446 and 4,421,582 assigned to the assignee of the present invention, the disclosures of which are incorporated herein by reference.

However, when the substrate has a "transition", i.e. it is of non-uniform cross-section, such as when pipes of different diameters have been joined or two telephone cables have been spliced together, in which case the splice area is of greater diameter than the cables, a smooth wrapping is much more difficult to obtain. This smooth wrapping has previously been achieved by the use of narrow tape which is thin and either elastomeric or composed of low yield material, e.g. PVC, so that one edge may be stretched with respect to the other. Narrow tape, however, suffers from a number of disadvantages, in particular:

(1) in order to render it extensible, it is necessarily relatively weak,
(2) because of the narrowness there are many lap areas, and the leak paths, which are generally one-half the tape width, are thus short,
(3) for the above reasons, installation is craft sensitive.

DESCRIPTION OF THE INVENTION

Brief Summary of the Invention

In a first embodiment, the present invention provides a pleated heat-recoverable tape which comprises a heat-shrinkable polymeric strip with a plurality of generally transverse pleats therein.

In a second embodiment, this invention provides a method of manufacturing the tape of this invention, which comprises manufacturing a polymeric strip, cross-linking it, stretching and pleating it at a temperature above its softening point, and cooling it in the deformed condition.

In a third embodiment, this invention provides a method of covering a substrate, which comprises wrapping the tape of this invention around the substrate, securing the free end of the tape, and heating the tape to its recovery temperature to cause it to shrink and tightly cover the substrate.

BRIEF DESCRIPTION OF THE DRAWING

FIG. 1 is an isometric view of an example of the tape of this invention showing the polymeric strip, adhesive layer, and thermochromic paint.

FIGS. 2 and 3 illustrate the method of using the tape to cover a substrate with a transition; FIG. 2 shows the tape wrapped around the substrate before recovery, and FIG. 3 shows the tape and substrate after recovery.

DETAILED DESCRIPTION OF THE INVENTION

The present invention provides a pleated heat-recoverable tape (preferably one which is shrinkable along its length without substantial change in its width) which comprises a heat-shrinkable polymeric strip with a plurality of generally transverse pleats therein.

The term pleat, as used in this application, has a broad meaning including, but not limited to, folds or creases which are doubled upon themselves, and which may be of any particular form; the word is intended to encompass any series of corrugations, folds, creases, or undulations by which a tape may be compacted into a smaller area than the surface area of its material. The term does not, however, include variation solely in the thickness of the material of the tape.

By a heat-recoverable article is herein meant an article which has been deformed from an original form in which it is dimensionally stable to the action of heat (apart from its normal thermal expansion) to a form in which it is dimensionally unstable to heat. Such an article will, when heated to a certain temperature known as the recovery temperature, recover or attempt to recover to its original dimensionally stable form. The original dimensionally heat-stable form may be a transient form in a continuous process in which, for example, an extruded tube is expanded, whilst hot, to a dimensionally heat-unstable form. More commonly, a preformed dimensionally heat stable article is deformed to a dimensionally heat unstable form in a separate stage.

Heat-recoverable articles are typically made from a polymer such as an olefinic polymer, for example polyethylene; a copolymer of ethylene with propylene, butene, vinyl acetate or ethyl arcylate; polyvinylchloride or polyvinylidene fluoride; which has been cross-linked, for example, chemically, or by irradiation with high energy electrons or -radiation. The tape of this invention will generally have a recovery temperature between about 60° C. and about 230° C., preferably between 85° C. and about 150° C.

By "shrinkable along its length with substantial change in its width" is meant that on recovery in the absence of external deforming forces, the width of the tape decreases by less than 25%, preferably by less than 10%, most preferably by less than 5%; and increases by less than 10%, preferably by less than 5%.

To enhance the covering provided by the tape, it may be made of a material which is self-adhesive at its recovery temperature. Polymer mixtures which possess this property include, for example, those disclosed in U.S. Pat. No. 4,001,065.

An alternative method of enhancing the covering provided by the tape is for it to have a coating of adhesive, which will bond the tape to itself and to the substrate, on at least a part of one side. The adhesives most suitable for use with this invention are those which are heat-activable. By a heat-activable adhesive is meant an adhesive which is relatively non-tacky at ambient temperature, but which will become tacky on heating to its activation temperature, and will provide an adhesive bond on return to ambient temperature after activation. Such adhesives include, for example, holt-melt adhesives, which are especially suitable for this invention. These adhesives preferably remain highly viscous at the recovery temperature of the tape, or they may "milk off" and/or permit layers of the tape to slide with respect to one another. The need for an adhesive of high viscosity is greater as the transition to be covered is steeper, and the risk of slippage of the tape layers thus greater. The adhesive may be cross-linked. Suitable adhesives include, for example, those disclosed in U.S. Pat. No. 4,018,733, the disclosure of which is incorporated herein by reference.

In addition, the tape of this invention may have a coating of a thermochromic paint on at least part of one side; that side being the one which is not adhesive-coated, if an adhesive is present. The thermochromic paint coating is especially suitable for tape with an adhesive coating, and the indicating temperature of the paint may be chosen so that it will indicate activation of the adhesive.

FIG. 1 is an isometric view of an example of the tape of this invention. The tape shown generally at 11 comprises polymeric strip 12, which has an adhesive coating 13 on one side and thermochromic paint 14 on the other. The depth of the pleats may be deeper (or shallower) than is shown in FIG. 1, or may be of different configuration depending on the materials and width of the tape.

The tape of this invention may be conveniently prepared by extrusion, and, if the adhesive is a hot-melt, the adhesive may be co-extruded with the tape. In order to render the tape heat-shrinkable, the polymer strip is preferably cross-linked, which may be conveniently done by electron irradiation. Other cross-linking methods, such as irradiation or chemical cross-linking, are also suitable.

Regardless of the method of expansion employed, the tape is stretched longitudinally by generally about 25% to about 200% (1.25× to 3.0×), preferably about 50% to 200% (1.5X to 3.0X), and especially about 100% (2.0×). The stretched tape is then generally transversely pleated by any suitable means, such as the use of corrugating rolls, to stretch it further by generally about 10% to about 150% of its stretched length (1.1× to 2.50×), preferably about 30% to about 100% (1.3× to 2.0×), and especially about 50% (1.5×).

Before expansion and pleating, the tape should preferably be of substantially uniform thickness to avoid regions of weakness in the expanded tape.

Since it is not convenient for the pleating process to longitudinally strain the tape evenly, the average extent of expansion that may be introduced by pleats is limited to less than the ultimate expansion of the material. Those skilled in the art will have no difficulty, having regard to their own knowledge and the disclosure herein, in determining suitable pleating procedures.

The preferred periodicity and shape of the pleats are to some extent determined by the properties of the material of the polymeric strip. To reduce the problem of uneven longitudinal strain, the pleats will generally be substantially sinusoidal and of regular periodicity, but such is not an essential feature of the invention. In general, the pleating will also be substantially uniform across the width of the tape, but such is not required by this invention; and tapes where the pleating is non-uniform, even to the extent of a portion of the width of the tape being unpleated, may be suitable for some purposes and are within the contemplation of this invention. For the tape to be extensible under a relatively small force, such as may conveniently be applied by hand during installation, tape having a higher bending stiffness will require deeper pleats than more flexible tape.

The pleats in the tape of this invention will preferably be such that the tape has a unit spring constant, defined as force per unit strain of the tape, at room temperature, i.e. at about 23° C., of less than 50 kg, more preferably 1–20 kg, especially 2–10 kg. These values are for a hand-wrap tape, and a machine-wrap tape may have a higher constant, for example, 100 kg or more. The tape will preferably, by reason of changes in the configuration of the pleats, be capable of an extension of one edge relative to the other. This relative extension may be accomplished either by extension of one edge with the length of the other edge remaining constant, by contraction of one edge with the length of the other edge remaining constant, or by simultaneous extension of one edge and contraction of the other edge. The unit spring constant for this relative extension will preferably be approximately the same as the unit spring constant for overall extension. On recovery when fixed at each end thereof and across the width thereof, the tape will preferably become substantially planar as a result of recovery of the pleats; and this planar tape will preferably, in the absence of restraining forces, be capable of at least a further 10% axial recovery.

While heat-shrinkable articles are generally heated to their recovery temperature by external heating means such as a gas torch or hot air gun, it is contemplated by this invention that the tape may also comprise integral heating means capable of producing the heat required for recovery. Such integral heating means may preferably be polymeric heating element capable of dimensional change (such as, for example, that described in U.S. Pat. No. 4,177,446) may be laminated to the polymeric strip. These examples are not intended to be exclusive, and the scope of this invention is not be be taken to be limited by them.

The width of the tape is preferably greater than about 1.5 cm in order to obtain the benefit of the pleats, and is more preferably between 5 and 30 cm, especially between about 5 and 15 cm. These widths are for a hand-wrap tape, and machine-wrap tape may be wider, for example, up to 1 m or more. Because a narrow tape will not require as great an extensibility on application or shrinkability on recovery as a wider tape to smoothly cover a substrate with a transition, the expansion ratio required may depend somewhat on the width of the tape. The thickness of the tape may depend on the material of the polymeric strip and adhesive, but preferably the strip will be less than about 1.5 mm thick after extension and pleating, with the adhesive layer, if present, generally thinner than that.

A particular advantage of the tape of this invention is that, because extensibility is at least partially provided by the pleats rather than necessarily by the properties of the tape material itself, the tape may be made from materials or in thicknesses or widths which would not permit a smooth wrapping of an unpleated tape. For instance, a 6.5 cm wide tape suitable for covering a transition from 1 cm to 5 cm radius over a length of 20 cm requires an average extensibility of about 40%. To provide this in a flat tape which can be applied by hand would necessarily require that the tape be narrow and easily deformable and either be thin (e.g. electrical tape) or have a low tensile modulus (e.g. rubber strip). Neither of these tapes will display good resistance to environmental conditions (e.g. heat, stress, wear, chemical exposure) after installation. Because of the pleats, however, the tape of this invention may be made from materials, in widths, etc., more appropriate to environmental conditions after installation and still provide a good covering.

This invention also provides a method of covering a substrate, especially a substrate with a transition, wherein the pleated tape is wrapped in an overlapping fashion about the substrate and the free end of the tape is secured to prevent unwrapping during recovery. The securing means may comprise, for example, an alligator clip, a toothed clip of the type used for "Ace" bandages, heat-resistant adhesive tape, or other suitable means. The tape is then heated with a gas torch, hot air gun, etc., or by integral heating means, to recover it tightly about the substrate and to activate the adhesive, if such is present. The correct temperature for recovery may be indicated by thermochromic paint placed on at least a portion of the side of the tape which is not adhesive coated.

FIGS. 2 and 3 illustrate the method of using the tape to cover a substrate with a transition. In FIG. 2, a substrate shown generally at 15 with a transition from a smaller end 16 to a larger end 17 is wrapped with the tape 18 of this invention, starting at the end 16 of the transition. The free end of the tape is secured by heat-resistant adhesive tape 19. In FIG. 3, the tape has been heated with a gas torch to effect recovery. The recovered tape 20 provide a smooth cover for the transition.

The following Example illustrates the invention:

EXAMPLE

A tape according to this invention was prepared by extruding a polymeric composition containing approximately 63% by weight ethylene-vinyl acetate copolymer (18% vinyl acetate), about 18% thermal black, about 17% filler, about 1% antioxidants, and about 1% of an agent designed to promote electron-beam cross-linking to give a strip of width 6.5 cm and thickness 1.0 mm. A hot melt adhesive layer of 0.5 mm thickness, comprising primarily an ethylene-ethyl acrylate copolymer and tackifier, ws coextruded onto one side of the tape. The resulting tape was cross-linked by exposure to 20 Mrad of 1 Mev electrons, and was then stretched longitudinally approximately 100%. The expanded tape was then transversely pleated by the use of a pleating press to afford approximately sinusoidal pleats of periodicity 15 mm and total depth 10 mm, which resulted in a further expansion of the tape by 50%.

A sample of this tape was wrapped around a substrate, the external diameter of which had a transition from 2.5 cm a to 10 cm, and the free end secured with an alligator clip. The tape was heated by a gas torch to above its recovery temperature, and contracted smoothly to cover and seal the joint. No pleats remained in the finished covering.

What I claim is:

1. A pleated heat-recoverable tape for covering and sealing a transition in an elongate substrate which does not have an accessible free end, the transition being between a first section of the substrate having a first size and a second section of the substrate having a second size which is substantially larger than the first size, comprising a heat-shrinkable polymeric strip having therein a plurality of heat-shrinkable generally transverse pleats which disappear upon recovery to provide a smooth surface and wherein the polymeric strip is self-adhesive or at least a portion of one side thereof has a coating of adhesive thereon having a sufficiently high viscosity at recovery temperature so as to prevent slipping of said tape during recovery.

2. A pleated heat-recoverable tape of claim 1 wherein said pleats have a stable configuration when the tape is at 23° C. and is not subject to deforming forces; said tape
    (1) being capable of an extension of one edge relative to the other as a result of changes in the configuration of the pleats; and
    (2) when fixed at each end thereof and across the width thereof and heated to its recovery temperature, becoming a substantially planar tape as a result of recovery of the pleats, said substantially planar tape, when heated to its recovery temperature in the absence of restraining forces, shrinking axially by at least 10%.

3. The tape of claim 1 wherein the adhesive is a heat-activatable adhesive.

4. The tape of claim 1 wherein the material comprising the polymeric strip is self-adhesive at the recovery temperature of the tape.

5. The tape of claim 3 wherein the tape has a coating of a thermochromic paint on the surface thereof remote from the substrate, the paint being capable of changing color is indicate that the adhesive has been activated.

6. The tape of claim 1 wherein the pleats in the tape are substantially sinusoidal and of regular periodicity.

7. The tape of claim 1 wherein the tape is 5 to 30 cm wide and has a unit spring constant at 23° C. of 1 to 20 kg.

8. The tape of claim 1 wherein the tape is composed of cross-linked polymeric material.

9. The tape of claim 1 wherein the tape, when wrapped around a substrate and fixed at each end thereof and across the width thereof and heated to its shrinkabe temperature, is capable of becoming substantially planar as a result of recovery of the pleats, said substantially planar tape, when heated to its shrinkage temperature in the absence of restraining forces and is capable of shrinking axially by at least 10%.

10. The tape of claim 1 which additionally comprises integral heating means.

11. The tape of claim 10 wherein the integral heating means are electrical heating means.

12. The tape of claim 1 which is shrinkable along its length without substantial change in its width.

* * * * *